United States Patent [19]

Sugano

[11] Patent Number: 5,038,637
[45] Date of Patent: Aug. 13, 1991

[54] ACCUMULATOR ARRANGEMENT FOR AUTOMATIC TRANSMISSION CONTROL CIRCUIT

[75] Inventor: Kazuhiko Sugano, Yokohama, Japan

[73] Assignee: Nissan Motor Co., Ltd., Yokohama, Japan

[21] Appl. No.: 264,701

[22] Filed: Oct. 31, 1988

[30] Foreign Application Priority Data

Oct. 30, 1987 [JP] Japan .................................. 62-273212

[51] Int. Cl.⁵ .............................................. B60K 41/06
[52] U.S. Cl. ....................................................... 74/868
[58] Field of Search ........................... 74/867, 868, 869

[56] References Cited

U.S. PATENT DOCUMENTS

| | | | |
|---|---|---|---|
| 3,623,382 | 11/1971 | Chana | 74/864 |
| 4,347,765 | 9/1982 | Leonard et al. | 74/869 |
| 4,729,265 | 3/1988 | Sugano | 74/868 |
| 4,730,521 | 3/1988 | Hayasaki et al. | 74/867 |
| 4,748,809 | 6/1989 | Sumiya et al. | 60/415 |
| 4,856,383 | 8/1989 | Rosen | 74/869 |
| 4,867,014 | 9/1989 | Sugano | 74/868 |
| 4,876,923 | 10/1989 | Crandall | 74/868 X |
| 4,889,016 | 12/1989 | Kuwayama et al. | 74/867 X |

FOREIGN PATENT DOCUMENTS 0190556 8/1986 European Pat. Off. .
61-165054 7/1986 Japan .

OTHER PUBLICATIONS

Patent Abstracts of Japan, vol. 10, No. 336 (M-535), Nov. 14, 1986, Publication No. 61140660.
Patent Abstracts of Japan, vol. 10, No. 372 (M-544), Dec. 11, 1986, Publication No. 61165054.

*Primary Examiner*—Dwight Diehl
*Attorney, Agent, or Firm*—Foley & Lardner

[57] ABSTRACT

A one-way valve is arranged with an accumulator in a manner wherein the discharging of the accumulator is restricted. During upshifting, the stroking of a band brake servo in a release direction is induced before the charging stroke of the accumulator and the appropriate timing of the engagement of a high clutch and the disengagement of a band brake is induced. During downshifting, the pressure which is prevailing in the conduit interconnecting the two friction elements is allowed to drop rapidly during the initial stage of the shift due to the provision of the one-way orifice and allows the torque transmission capacity of the clutch to quickly reduce while inducing the stroking of the band brake servo in an engaging direction before the discharge stroke of the accumulator.

5 Claims, 5 Drawing Sheets

FIG. 4a  HYD. PRESS.
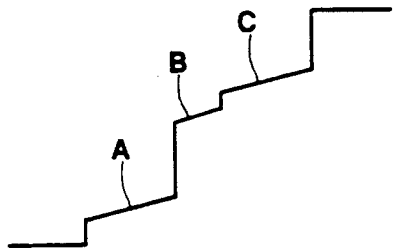
FIG. 4b  OUTPUT SHAFT TORQUE
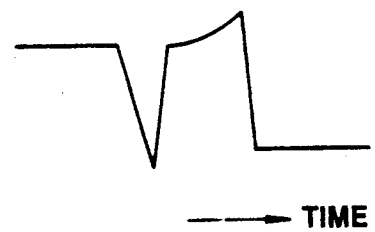
→ TIME
FIG. 5a  HYD. PRESS.
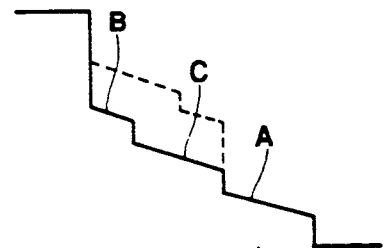
FIG. 5b  OUTPUT SHAFT TORQUE
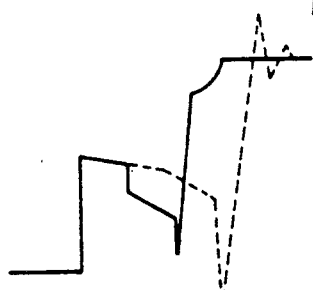
→ TIME

FIG. 6

| | | R/C | H/C | F/C | O/C | B/B 2A | B/B 3R | B/B 4A | L&R/B | F/O | L/O | GEAR RATIO | α1 = 0.45<br>α2 = 0.45 |
|---|---|---|---|---|---|---|---|---|---|---|---|---|---|
| D RANGE | ENGINE DRIVING | 1 ST | | | ○ | | | | | | | ○ | $\dfrac{1+\alpha_1}{\alpha_1}$ | 3.22 |
| | | 2 ND | | | ○ | | | ○ | | | ○ | | $\dfrac{\alpha_1+\alpha_2+\alpha_1\alpha_2}{\alpha_1(1+\alpha_2)}$ | 1.69 |
| | | 3 RD | | ○ | ○ | | ○ | | | | ○ | | 1 | 1 |
| | | 4 TH | | ○ | (○) | ○ | ○ | | ○ | | | | $\dfrac{1}{1+\alpha_2}$ | 0.69 |
| | ENGINE BRAKING | 1 ST | | | (○) | ○ | ○ | ○ | | | | | | |
| | | 2 ND | | | (○) | ○ | ○ | ○ | | | | | | |
| | | 3 RD | | ○ | (○) | ○ | ○ | | | | | | | |
| | | 4 TH | | ○ | (○) | | ○ | | ○ | | | | | |
| 2 ND RANGE | | 1 ST | | | ○ | | | ○ | | | ○ | | | |
| | | 2 ND | | | ○ | | | | | | ○ | ○ | | |
| 1 ST RANGE | | 1 ST | | | ○ | | | | | ○ | ○ | | | |
| REVERSE | | | ○ | | | | | | | ○ | | | $-\dfrac{1}{\alpha_2}$ | −2.22 |

( ) UNRELATED TO POWER TRANSMISSION

5,038,637

ACCUMULATOR ARRANGEMENT FOR AUTOMATIC TRANSMISSION CONTROL CIRCUIT

BACKGROUND OF THE INVENTION

1. Field of the Invention

The present invention relates generally to an automatic transmission and more specifically to a hydraulic control circuit therefor which includes a shift shock attenuating arrangement.

2. Desription of the Prior Art

JP-A-61-165054 discloses a hydraulic transmission control system wherein a given shift valve is arranged to control the engagement of first and second friction elements. More specifically, this valve is arranged to upon switching to an upshift position, induce the engagement of one friction element and the release of the other. As the shift valve is arranged to supply hydraulic fluid to both of the friction elements in order to achieve the above engagement and release, an orifice and an accumulator are provided. The orifice is provided between the shift valve and the accumulator.

With this arrangement as the accumlator is used both during upshifting and downshifting an essentially constant pressure is maintained for the purposes of attenuating shift shock.

However, with this arrangement, the downshifting period tends to be prolonged and induces shift shock. That is to say, during downshifting the reduction in the pressure which is applied to the first friction element is delayed by the action of the accumulator and the time required for the completion of the shift exceeds the desired value. Further, at the point in time where the stroke of the accumulator terminates, a sudden reduction in hydraulic fluid pressure occurs and a momentary application of a large amount of torque induces a large shock.

One method of overcoming this problem is to reduce the fixed pressure level which is maintained by the accumulator. However, this measure induces the problem that the reduced level deteriorates the shift feeling during a 2-3 upshift.

SUMMARY OF THE INVENTION

It is an object of the present invention to provide an accumulator/shift valve arrangement via which hydraulic fluid can be supplied to and drained from friction elements in a manner which takes advantage of the accumulator during upshift and which modifies the pressure release characteristics of the same during downshifting in a manner which alleviates the generation of shift shock.

In brief, the above object is achieved by a control circuit wherein a one-way valve is arranged with an accumulator in a manner wherein the discharging of the accumulator is restricted. During upshifting, the stroking of a band brake servo in a release direction is induced before the charging stroke of the accumulator and the appropriate timing of the engagement of a high clutch and the disengagement of a band brake is induced. During downshifting, the pressure which is prevailing in the conduiting interconnecting the two friction elements is allowed to drop rapidly during the intial stage of the shift due to the provision of the one-way orifice and allows the torque transmission capacity of the clutch to quickly reduce while inducing the stroking of the band brake servo in an engaging direction before the discharge stroke of the accumulator.

More specifically, a first aspect of the present invention is deemed to comprise a transmission which features: first and second friction elements, the first friction element being arranged to be engaged when supplied with hydraulic fluid, the second friction element having a release chamber and arranged so that when the release chamber is supplied with hydraulic fluid the second friction element is conditioned to assume a disengaged condition; an accumulator; a shift valve, the shift valve being fluidly communicated with the first friction element, the release chamber of the second friction elements and the accumulator through conduit means, the shift valve having a first position wherein hydraulic fluid is supplied to the first friction element, the release chamber and the accumulator via the conduit means and a second position wherein the conduit means is connected with a drain; a fixed orifice disposed in the conduit means, the fixed orifice restricting communication between the shift valve, and the first friction element, the release chamber and the accumulator; and a one-way orifice disposed in the conduit means in a manner to permit hydraulic fluid to be supplied freely to the accumulator and for the discharge of hydraulic fluid from the accumulator to be resisted.

A second aspect of the present invention is deemed to comprise a transmission which features: a clutch, the clutch being arranged to be engaged when supplied with hydraulic fluid and to produce a third speed gear ratio when engaged; a brake, the brake having a release chamber and first and second apply chambers, the brake being arranged so that when the release chamber is supplied with hydraulic fluid, the brake is conditioned to assume a disengaged condition, the band brake being arranged to produce a second speed gear ratio when engaged and the first friction element is released; a servo release accumulator; a 2-3 shift valve, the shift valve being fluidly communicated with the clutch, the release chamber and the accumulator through conduit means, the shift valve having a first position wherein hydraulic fluid is supplied to the first friction element, the release chamber and the accumulator via the conduit means and a second position wherein the conduit means is connected with a drain; a fixed orifice disposed in the conduit means, the fixed orifice restricting communication between the shift valve, and the first friction element, the release chamber and the accumulator; and a one-way orifice disposed in the conduit means in a manner to permit hydraulic fluid to be supplied freely to the accumulator and for the discharge of hydraulic fluid from the accumulator to be resisted.

BRIEF DESCRIPTION OF THE DRAWINGS

FIGS. 4(a and b) and 5(a and b) are timing charts showing the relationships between the hydraulic fluid pressure supplied to the friction elements and the amount of torque which is applied to the transmission output shaft, in accordance with the operation of the present invention; and FIG. 6 is a table showing the relationship between the friction element engagement and the gear ratio produced by the transmission arrangement shown in FIGS. 2 and 3.

DETAILED DESCRIPTION OF THE PREFERRED EMBODIMENTS

Figure 2:
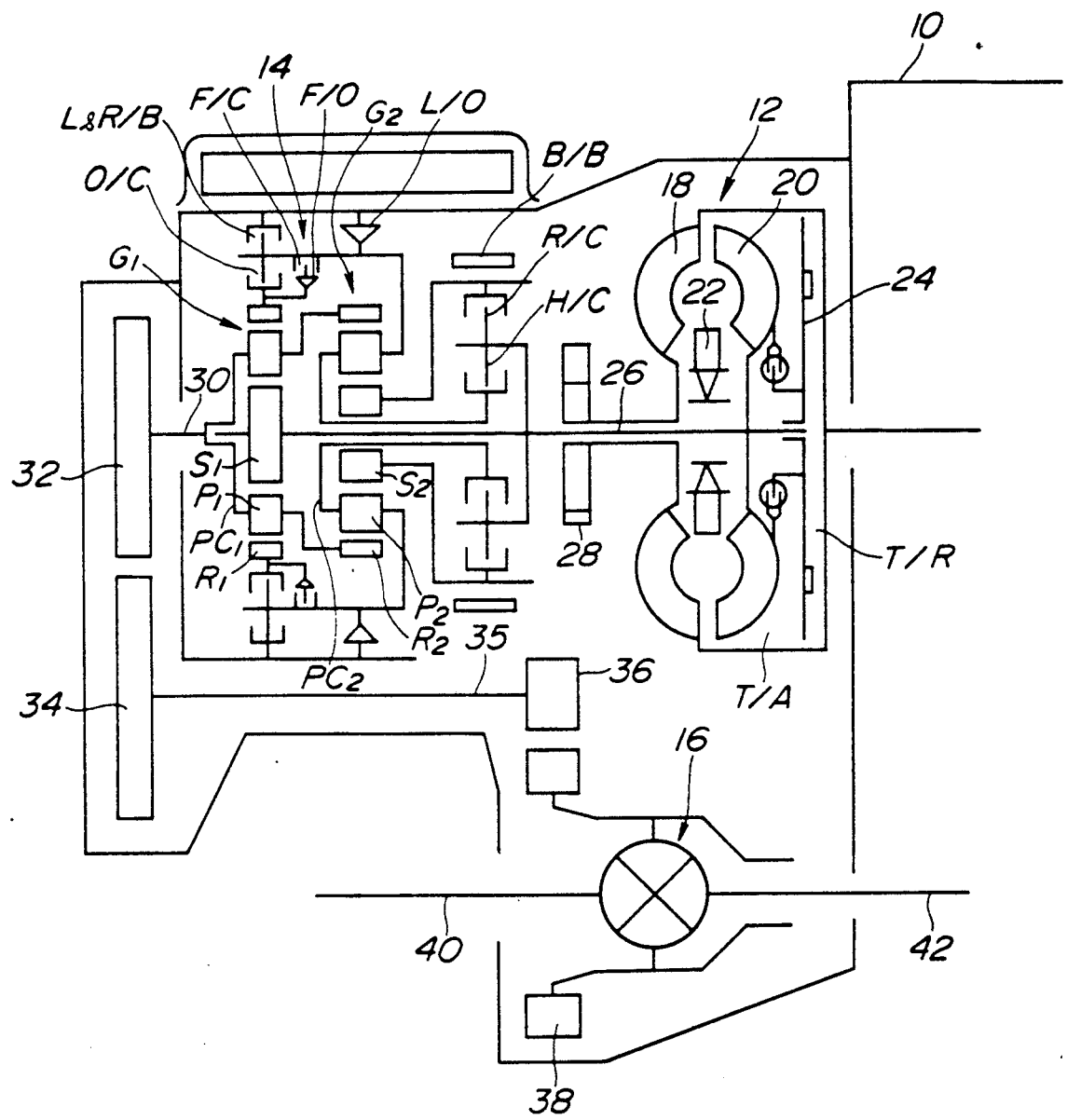
FIG. 2 is a schematic elevation showing a transaxle of the type to which the present invention can be applied.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged, torque from the engine crankshaft (no numeral) is supplied by way of the pump impeller 18 to a transmission input shaft 26. However, upon engagement of the lock-up clutch 24 the torque is supplied directly to the input shaft 26.

In this transaxle, the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which mesh with the ring and sun gears. The pinion gears are of course rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward one-way cluch F/O and the overrunning clutch O/C. Sun gear S2 is selectively connectable with the input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallel low one-way clutch L/O and low and reverse brake L&R/B in a manner which enables the same to be selectively held stationary.

An output gear 32 is fixed to one end of the output shaft 30 and arranged to mesh with an idler ger 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

With the above described arrangement selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 6.

It should be noted that in this table the circles denote the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in the table indicate the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in the table denote the ratios defined between the rotational speeds of the output and input shafts 30, 26.

With the above described transmission arrangement rotational power or torque is transferred via the gear train from the input shaft 26 to the output shaft 30 and to the final drive or differential unit 16 by way of the output gear 30, the idler gear 34, reduction gear 36 and the ring gear 30. In fourth speed an overdrive condition is established.

Figure 3:
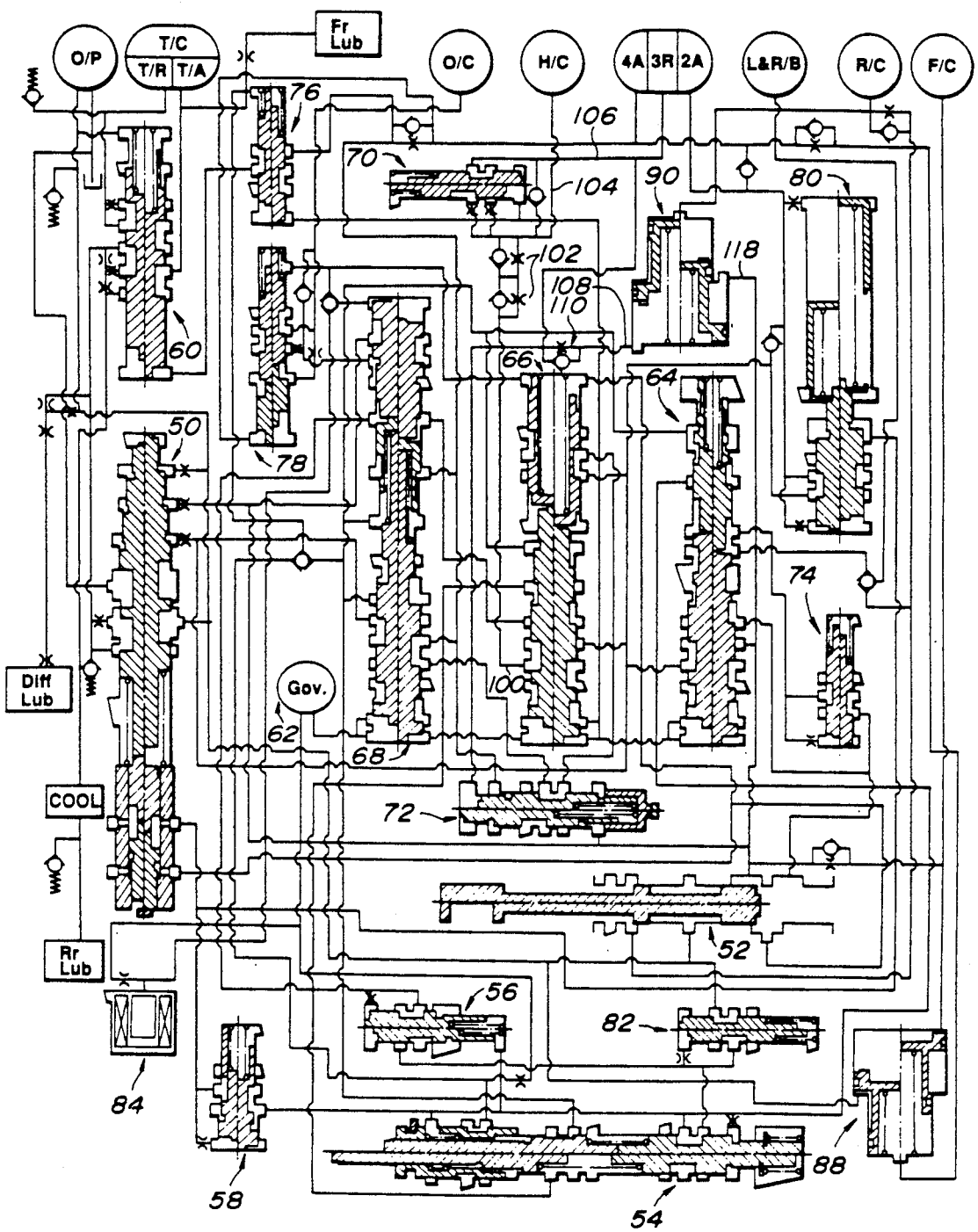
FIG. 3 is a schematic plan view showing a control circuit of the type which is used to control the transmission of the transaxle arrangement shown in FIG. 2 and which incorporates the present invention.

In order to control the above described gear train the hydraulic spool valve system of the nature shown in FIG. 3 is used.

This system includes a pressure regulator valve 50, a manual valve 52, a throttle valve 54, a throttle modifier valve 58, a lock-up control valve 60, a governor valve 62, a 1-2 shift valve 64, a 2-3 shift valve 66, a 3-4 shift valve 68 3-2 timing valve 70, a 4-2 sequence valve 72, a fixed first speed pressure reducing valve 74, a speed cut-back valve 76, an overrunning clutch control valve 78, a 1-2 accumulator valve 80, a kickdown modifier valve 83, an N-D accumulator 88 and a servo release accumulator 90.

Figure 1:
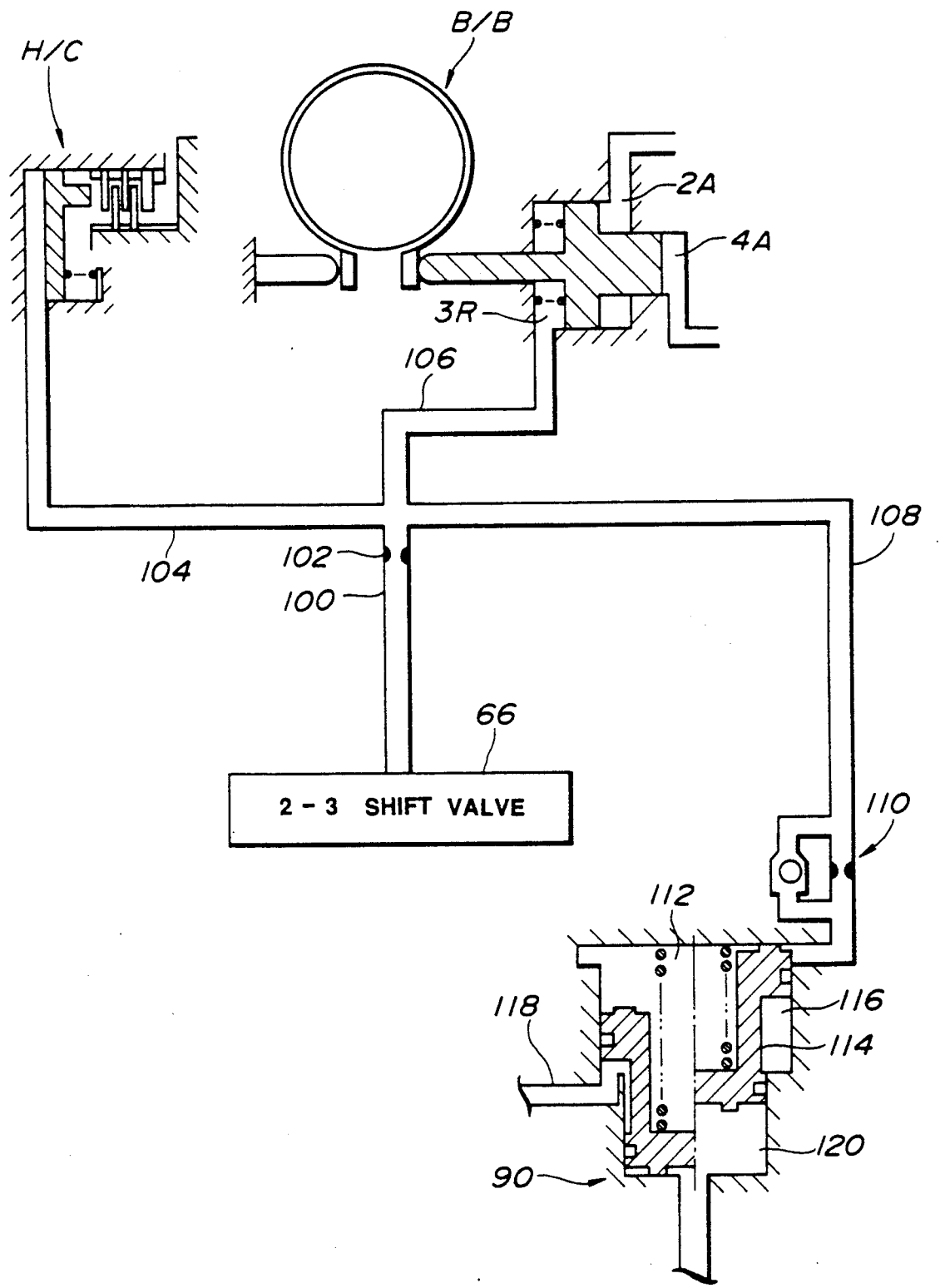
FIG. 1 is a schematic sectional view showing the arrangement which characterizes the instant invention.

FIG. 1 shows the circuit arrangement which characterizes the present invention. In this arrangement the illustrated elements are arranged so that when the 2-3 shift valve 66 switches from its downshift position to its upshift one, conduit 100 is disconnected from the drain and connected with a source of line pressure. This pressure is distributed via orifice 102 into conduits 104, 106 and 108.

As shown, conduit 104 communicates with the high clutch H/C, conduit 106 communicates with the third speed release chamber of the band brake B/B and conduit 108 communicates with chamber 112 of the servo release accumulator 90 by way of one-way orifice 110.

The servo release accumulator 90 includes a stepped piston 114 which is reciprocatively disposed in a stepped bore (no numeral). With this arrangement a chamber 112 is defined by the large diameter land, an annular chamber 116 is defined by the section between the large and small diameter lands and a third chamber 120 is defined by the small diameter land. A spring (no numeral) is disposed in chamber 112 as shown in FIG. 3 and arranged to bias the stepped piston 114 in a direction which tends to minimize the volume of annular chamber 116. In this instance the third chamber 120 is normally connected to drain and pressurized only when the transmission is conditioned to produce reverse gear while the annular chamber 116 is supplied with a suitable back pressure via conduit 118. In this instance conduit 118 is connected with the manual valve 52 in a manner to be supplied with line pressure during all forward gears of the transmission.

As will be appreciated the one-way orifice 110 is arranged to permit the servo release accumulator to be freely charged and to restrict the draining of the hydraulic fluid from chamber 112.

The operation of the above described arrangement is as follows: when the 2-3 shift valve 66 upshifts, line pressure is supplied into conduit 100. Accordingly, the high clutch H/C and the third speed release chamber 3R of the band brake are supplied with hydraulic fluid. This induces the engagement of the high clutch H/C and the disengagement of the band brake B/B and the transmission is conditioned to produce third speed. During this shift, hydraulic fluid passes via orifice 102 and conduit 108 into chamber 112 of the servo release accumulator. As a result, the servo release accumulator piston 114 begins to stroke downwardly toward the position shown by the left hand section. It will be noted that the one-way orifice 110 does not restrict the supply of hydraulic fluid into chamber 112 at this time.

As the piston 112 continues to stroke downwardly, the level of the pressure prevailing in conduits 104, 106 and 108 (and therefore the H/C and chamber 3R) downstream of the orifice 102 is maintained essentially constant at a predetermined level. Accordingly, the pressure which develops in the high clutch H/C and the band brake B/B develops as show in FIG. 4.

As indicated in this figure, during the initial stage of the shift the pressure develops sharply for a short time and then levels off into a first stage indicated by a level or step A due to the stroking of the piston included in the servo of the high clutch H/C. Following this, the pressure undergoes another sharp increase and levels off as the piston of the band brake servo strokes and establishes a second step or level B. Step or level C is subsequently produced by the stroking of the servo release accumulator piston 114. At the end of this stroke the pressure level rises to line level. As will be noted, level C is such as to maintain the rate at which the pressure increases at a value which is close to constant.

The torque which is supplied to the output shaft of the transmission varies as indicated in trace (b) and in manner wherein shift shock is attenated.

During a 3-2 downshift the supply of line pressure to conduit 110 is cut-off and this conduit is connected to drain. The pressurized hydraulic fluid which has been supplied into the high clutch H/C and the third speed release chamber 3R of the band brake B/B are drained by way of orifice 102. Under these conditions the pressure prevailing in the above mentioned friction elements varies as shown in FIG. 5. As will be appreciated from trace 5(a) the level of pressure firstly undergoes a sudden drop from line pressure level to level B. Following this sudden drop, the stroking of the band brake piston slows the pressure decrease as indicated by stage B. Next, the movement of the servo release accumulator piston 114 in a direction which reduces the volume of chamber 112 maintains the pressure in conduits 104, 106 and 108 as indicated by step or level C. It will be noted that the one-way orifice 110 becomes effective during this mode of operation and reduces the rate at which hydraulic fluid is permitted to drain from chamber 112. Following this, the stroking of the high clutch H/C slows the pressure decrease as indicated by stage A. Following stage A, the pressure drops to zero and the draining process terminates.

With this type of 3-2 downshift the pressure staging is such that level B is determined by the stroking of the band brake servo piston, stage C is determined by the stroking of the servo release accumulator piston and stage A by the stroking of the H/C servo, and the pressure decreases in a B-C-A sequence. On the other hand, during the upshift the pressure increase sequence is A-B-C.

The reason for this change in sequence is due to the provision of the one-way orifice 110. Further, as shown in FIG. 5(a) with the provision of the one-orifice 110, the pressure prevailing in conduits 104, 106 and 108 is able to drop very rapidly during the initial stage of the downshift as compared to the case wherein the orifice is not provided and the depressurization characteristics, such as shown in the broken line, occur. Accordingly, with the present invention, the torque transmission capacity of the high clutch H/C can be rapidly decreased and the band brake B/B conditioned toward, partial enagagement. In addition to this the stroking of the servo release accumulator piston 114 occurs between the stroking of the band brake servo piston and that of the high clutch H/C. Accordingly, as shown in FIG. 5(b) the time required to complete the shift is reduced and the torque transmission characteristics produced by the invention (solid line trace) modified, as compared with the instance the one-way orifice 110 is not provided (broken line trace) in a manner which reduces the shift shock by removing the sequential negative and positive spikes in the torque applied to the output shaft.

What is claimed is:

1. In a transmission
   first and second friction elements, said first friction element being arranged to be engaged when supplied with hydraulic fluid, said second friction element having a release chamber and arranged so that when said release chamber is supplied with hydraulic fluid said second friction element is conditioned to assume a disengaged condition;
   an accumulator;
   a shift valve;
   conduit means for fluidly communicating said shift valve with said first friction element, said release chamber of said second friction element and said accumulator, said shift valve having a first position wherein hydraulic fluid is supplied to said first friction element, said release chamber and said accumulator via said conduit means and a second position wherein said conduit means is connected to a drain;
   a fixed orifice disposed in said conduit means, said fixed orifice restricting communication between said shift valve, and said first friction element, said release chamber and said accumulator; and
   a one-way orifice disposed in said conduit means in a manner to permit hydraulic fluid to be supplied freely to said accumulator and for the discharge of hydraulic fluid from said accumulator to be resisted, said one way orifice being arranged between said accumulator and both of said first and second friction elements.

2. In a transmission
   a clutch, said clutch being arranged to be engaged when supplied with hydraulic fluid and to produce a third speed gear ratio when engaged;
   a brake, said brake having a release chamber and first and second apply chambers, said brake being arranged so that when said release chamber is supplied with hydraulic fluid said brake is conditioned to assume a disengaged position, said brake being arranged to produce a second gear when engaged and said clutch is released;

a servo release accumulator;

a 2-3 shift valve;

conduit means for fluidly communicating said shift valve with said clutch, said release chamber and said accumulator, said shift valve having a first position wherein hydraulic fluid is supplied to said clutch, said release chamber and said accumulator via said conduit means and a second position wherein said conduit means is connected with a drain;

a fixed orifice disposed in said conduit means, said fixed orifice being disposed between said shift valve, and said clutch, between said shift valve and said release chamber and between said shift valve and said accumulator; and a one-way orifice disposed in said conduit means, between both of said clutch and the release chamber, of said brake and the accumulator, said one-way orifice being arranged in a manner to permit hydraulic fluid to be supplied freely to said accumulator and for the discharge of hydraulic fluid from said accumulator to be resisted.

3. In a transmission first and second friction elements, said first friction element being arranged to be engaged when supplied with hydraulic fluid, said second friction element having a release chamber and arranged so that when said release chamber is supplied with hydraulic fluid said second friction element is conditioned to assume a disengaged condition;

an accumulator;

a shift valve;

conduit means for fluidly communicating said shift valve with said first friction element, said release chamber of said second friction element and said accumulator, said shift valve having a first position wherein hydraulic fluid is supplied to said first friction element, said release chamber and said accumulator via said conduit means and a second position wherein said conduit means is connected to a drain;

a fixed orifice disposed in said conduit means, said fixed orifice restricting communication between said shift valve, and said first friction element, said release chamber and said accumulator; and a one-way orifice disposed in said conduit means in a manner to permit hydraulic fluid to be supplied freely to said accumulator and for the discharge of hydraulic fluid from said accumulator to be resisted and wherein said accumulator comprises:

a stepped piston reciprocatively disposed in a stepped bore, said stepped piston having a first large diameter land and a second small diameter land, said first and second lands defining first, second and third chamber in said bore, said first chamber being fluidly communicated with said conduit means, said second chamber being essentially annular in shape and communicated with a source of back pressure, said source of back pressure being arranged to supply hydraulic fluid under pressure when said transmission is conditioned to produce forward speed, said third chamber being supplied with hydraulic fluid under pressure when said transmission is conditioned to produce reverse gear, said first chamber housing a spring which tends to bias said piston in a direction which minimizes the volume of said third chamber.

4. In a transmission a first friction element, said first element being arranged to be engaged when supplied with hydraulic fluid;

a shift valve;

a first conduit leading from said shift valve to said first friction element;

a fixed orifice disposed in said first conduit;

a second friction element, said second friction element having a release chamber and arranged so that when said release chamber is supplied with hydraulic fluid said second friction element is conditioned to assume a disengaged condition;

a second conduit which leads from said first conduit to said release chamber of said second friction element, said second conduit communicating with said first conduit at a location between said first friction element and said fixed orifice;

an accumulator;

a third conduit which fluidly communicates with one of said first and second conduits at a predetermined location, said third conduit leading to and fluidly communicating with said accumulator, said fixed orifice being located between said predetermined location and said shift valve; and a one-way orifice disposed in said third conduit, said one-way orifice permitting hydraulic fluid to be supplied freely to said accumulator and for the discharge of hydraulic fluid from said accumulator to be resisted.

5. In a transmission a shift valve;

a first friction element, said first friction element being fluidly communicated with said shift valve and arranged so as to be engaged when supplied with hydraulic fluid therefrom;

a second friction element, said second friction element having a release chamber which is fluidly communicated with said shift valve and arranged so that when said release chamber is supplied with hydraulic fluid from said shift valve said second friction element is conditioned to assume a disengaged condition;

an accumulator, said accumulator having a first chamber which is fluidly communicated with said first friction element and the release chamber of said second friction element, a second chamber which is fluidly communicated with a source of back pressure only when the transmission is conditioned to produce forward drive and a third chamber which is fluidly communicated with a source of back pressure when the transmission is conditioned to produce a reverse drive; and a one-way orifice, said one-way orifice permitting hydraulic fluid to be supplied freely to the first chamber of said accumulator and for the discharge of hydraulic fluid from the first chamber of said accumulator to be resisted.

* * * * *